United States Patent
Li et al.

(10) Patent No.: US 10,643,602 B2
(45) Date of Patent: May 5, 2020

(54) ADVERSARIAL TEACHER-STUDENT LEARNING FOR UNSUPERVISED DOMAIN ADAPTATION

(71) Applicant: Microsoft Technology Licensing, LLC, Redmond, WA (US)

(72) Inventors: Jinyu Li, Redmond, WA (US); Zhong Meng, Redmond, WA (US); Yifan Gong, Sammamish, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 231 days.

(21) Appl. No.: 15/923,795

(22) Filed: Mar. 16, 2018

(65) Prior Publication Data

US 2019/0287515 A1    Sep. 19, 2019

(51) Int. Cl.
| | |
|---|---|
| *G10L 15/06* | (2013.01) |
| *G06N 20/00* | (2019.01) |
| *G10L 15/16* | (2006.01) |
| *G10L 15/02* | (2006.01) |

(52) U.S. Cl.
CPC ............ *G10L 15/063* (2013.01); *G06N 20/00* (2019.01); *G10L 15/02* (2013.01); *G10L 15/16* (2013.01)

(58) Field of Classification Search
CPC ........ G10L 15/063; G10L 15/02; G10L 15/16
See application file for complete search history.

(56) References Cited

U.S. PATENT DOCUMENTS

| | | | | |
|---|---|---|---|---|
| 2016/0078339 | A1* | 3/2016 | Li | ............... G06N 3/084 706/20 |
| 2018/0330737 | A1* | 11/2018 | Paulik | ............. G10L 15/07 |
| 2019/0051290 | A1* | 2/2019 | Li | ............... G10L 15/16 |
| 2019/0205748 | A1* | 7/2019 | Fukuda | ............. G06N 3/0454 |
| 2019/0244604 | A1* | 8/2019 | Masataki | ........ G06F 17/2785 |

(Continued)

OTHER PUBLICATIONS

Bousmalis, et al., "Domain separation networks", In Proceedings of 30th Conference on Neural Information Processing Systems, Dec. 5, 2016, pp. 1-9.

(Continued)

*Primary Examiner* — Matthew H Baker
(74) *Attorney, Agent, or Firm* — Schwegman Lundberg & Woessner, P.A.

(57) ABSTRACT

Methods, systems, and computer programs are presented for training, with adversarial constraints, a student model for speech recognition based on a teacher model. One method includes operations for training a teacher model based on teacher speech data, initializing a student model with parameters obtained from the teacher model, and training the student model with adversarial teacher-student learning based on the teacher speech data and student speech data. Training the student model with adversarial teacher-student learning further includes minimizing a teacher-student loss that measures a divergence of outputs between the teacher model and the student model; minimizing a classifier condition loss with respect to parameters of a condition classifier; and maximizing the classifier condition loss with respect to parameters of a feature extractor. The classifier condition loss measures errors caused by acoustic condition classification. Further, speech is recognized with the trained student model.

20 Claims, 9 Drawing Sheets

(56) References Cited

U.S. PATENT DOCUMENTS

2019/0378006 A1* 12/2019 Fukuda ............... G06N 3/08

OTHER PUBLICATIONS

Deng, et al., "Recent Advances in Deep Learning for Speech Research at Microsoft", In Proceedings of IEEE International Conference on Acoustics, Speech and Signal Processing, May 26, 2013, 5 Pages.

Ganin, et al., "Unsupervised domain adaptation by backpropagation", In Proceedings of 32nd International Conference on Machine Learning, Jul. 6, 2015, 10 Pages.

Gemello, et al., "Linear hidden transformations for adaptation of hybrid ANN/HMM models", In Journal of Speech Communication, vol. 49, No. 10-11, Oct. 2007, 20 Pages.

Goodfellow, et al., "Generative adversarial nets", In Proceedings of Advances in Neural Information Processing Systems, Dec. 8, 2014, pp. 1-9.

Hinton, et al., "Deep Neural Networks for Acoustic Modeling in Speech Recognition: The Shared Views of Four Research Groups", In Proceedings of the IEEE Signal Processing Magazine, vol. 29, Issue 6, Nov. 1, 2012, pp. 82-97.

Huang, et al., "Maximum a posteriori adaptation of network parameters in deep models", In Proceedings of International Speech Communication Association, Sep. 6, 2015, 5 Pages.

Jaitly, et al., "Application of Pretrained Deep Neural Networks to Large Vocabulary Speech Recognition", In Proceedings of 13th Annual Conference of the International Speech Communication Association, Sep. 9, 2012, 4 Pages.

Li, et al., "Feature engineering in context-dependent deep neural networks for conversational speech transcription", In Proceedings of IEEE Workshop on Automatic Speech Recognition Understanding, Dec. 11, 2011, pp. 24-29.

Li, et al., "Large-scale domain adaptation via teacher-student learning", In Journal of Computing Research Repository, Aug. 17, 2017, 5 Pages.

Li, et al., "Learning small-size DNN with output-distribution-based criteria", In Proceedings of 15th Annual Conference International Speech Communication Association, Sep. 14, 2014, pp. 1910-1914.

Liao, Hank, "Speaker Adaptation of Context Dependent Deep Neural Networks", In Proceedings of the IEEE International Conference on Acoustics, Speech and Signal Processing, May 26, 2013, 5 Pages.

Marxer, et al., "The third 'chime' speech separation and recognition challenge: Dataset, task and baselines", In Proceedings of IEEE Workshop on Automatic Speech Recognition and Understanding, Dec. 13, 2015, 10 Pages.

Meng, et al., "Unsupervised Adaptation with Domain Separation Networks for Robust Speech Recognition", In Proceedings of IEEE Automatic Speech Recognition and Understanding Workshop, Dec. 16, 2017, 8 Pages.

Sainath, et al., "Making Deep Belief Networks Effective for Large Vocabulary Continuous Speech Recognition", In Proceedings of IEEE Workshop on Automatic Speech Recognition and Understanding, Dec. 11, 2011, pp. 30-35.

Samarakoon, et al., "Factorized hidden layer adaptation for deep neural network based acoustic modeling", In Journal of IEEE/ACM Transactions on Audio, Speech, and Language Processing, vol. 24, No. 12, Dec. 2016, pp. 2241-2250.

Saon, et al., "Speaker adaptation of neural network acoustic models using i-vectors", In Proceedings of IEEE Workshop on Automatic Speech Recognition and Understanding, Dec. 8, 2013, pp. 55-59.

Seide, et al., "Conversational Speech Transcription using Context-Dependent Deep Neural Networks", In Proceedings of 12th Annual Conference of the International Speech Communication Association, Aug. 28, 2011, pp. 437-440.

Senior, et al., "Long short-term memory recurrent neural network architectures for large scale acoustic modeling", In Proceedings of Fifteenth Annual Conference of the International Speech Communication Association, Sep. 14, 2014, pp. 338-342.

Serdyuk, et al., "Invariant representations for noisy speech recognition", In Proceedings of 30th Conference on Neural Information Processing Systems, Dec. 5, 2016, pp. 1-5.

Shinohara, Yusuke, "Adversarial multi-task learning of deep neural networks for robust speech recognition", In Proceedings of International Speech Communication Association, Sep. 8, 2016, pp. 2369-2372.

Sun, et al., "An unsupervised deep domain adaptation approach for robust speech recognition", In Journal of Neurocomputing, vol. 257, Sep. 27, 2017, pp. 1-9.

Xue, et al., "Fast adaptation of deep neural network based on discriminant codes for speech recognition", In Journal of IEEE/ACM Transactions on Audio, Speech, and Language Processing, vol. 22, No. 12, Dec. 2014, pp. 1713-1725.

Xue, et al., "Restructuring of Deep Neural Network Acoustic Models with Singular Value Decomposition", In Proceedings of 14th Annual Conference of the International Speech Communication Association, Aug. 25, 2013, 5 Pages.

Xue, et al., "Singular Value Decomposition Based Low-Footprint Speaker Adaptation and Personalization for Deep Neural Network", In Proceedings of IEEE International Conference on Acoustics, Speech and Signal Processing, May 4, 2014, pp. 6359-6363.

Yu, et al., "KL-Divergence Regularized Deep Neural Network Adaptation for Improved Large Vocabulary Speech Recognition", In Proceedings of IEEE International Conference on Acoustics Speech and Signal Processing, May 26, 2013, pp. 7893-7897.

Yu, et al. "Recent progresses in deep learning based acoustic models", In IEEE/CAA Journal of Automatica Sinica, vol. 4, No. 3, Jul. 2017, pp. 400-413.

Zhao, et al., "Low-rank plus diagonal adaptation for deep neural networks", In Proceedings of IEEE International Conference on Acoustics, Speech and Signal Processing, Mar. 20, 2016, pp. 5005-5009.

Li, et al., "Speech Recognition Source to Target Domain Adaptation", Application as Filed in U.S. Appl. No. 15/814,910, filed Nov. 16, 2017, 37 Pages.

* cited by examiner

ADVERSARIAL TEACHER-STUDENT LEARNING FOR UNSUPERVISED DOMAIN ADAPTATION

TECHNICAL FIELD

The subject matter disclosed herein generally relates to methods, systems, and programs for speech recognition, more particularly, methods, systems, and computer programs for improving the quality of speech recognition.

BACKGROUND

Automatic speech recognition (ASR) often requires large datasets of well-maintained and annotated utterances to train the models used to accurately identify the words that users speak. Gathering such large datasets is often time consuming, and maintaining such datasets requires large expenditures of computer storage space.

Further, individual ASR systems are frequently trained for a single domain (such as a given user's voice, a given compression codec, a given microphone setup, a certain environment, etc.), and new models need to be trained for each domain to accurately interpret speech received within that domain. This requires the gathering and storage of ever more and ever larger datasets to accurately create models for use in identifying speech in different domains, causing longer training times for the machine-learning programs used for speech-recognition.

Additionally, creating a different model for each different domain requires the ability to prepare for many domains, such as thousands or millions of domains when considering the diversity of individuals, environments where the individuals speak, accents, etc. What is needed is the ability to leverage existing, reliable domains to train and operate other domains.

BRIEF DESCRIPTION OF THE DRAWINGS

Various ones of the appended drawings merely illustrate example embodiments of the present disclosure and cannot be considered as limiting its scope.

DETAILED DESCRIPTION

Figure 1:
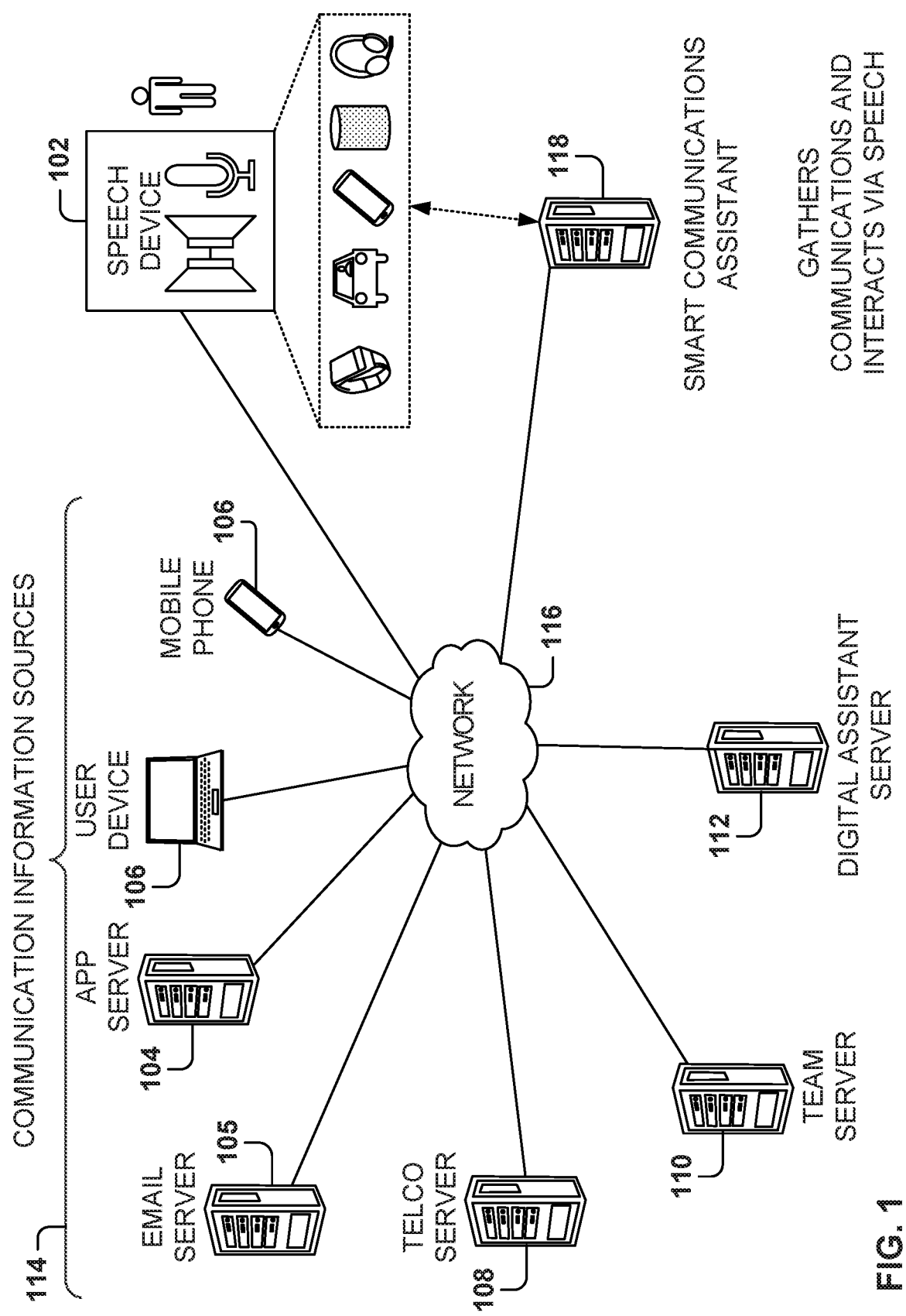
FIG. 1 is an architecture of a system for implementing speech recognition, according to some example embodiments

Example methods, systems, and computer programs are directed to training, with one or more adversarial constraints, a student model for speech recognition based on a teacher model. Examples merely typify possible variations. Unless explicitly stated otherwise, components and functions are optional and may be combined or subdivided, and operations may vary in sequence or be combined or subdivided. In the following description, for purposes of explanation, numerous specific details are set forth to provide a thorough understanding of example embodiments. It will be evident to one skilled in the art, however, that the present subject matter may be practiced without these specific details.

ASR may suffer large performance degradation when a well-trained acoustic model is presented in a new domain. Teacher-student (T/S) learning is an effective approach towards unsupervised domain adaptation, where T/S learning refers to the ability of training a neural-network-based acoustic model (referred to also as the student network or the student model) based on the information associated with another acoustic model (referred to as the teacher network or the teacher model). For example, a teacher model may be trained for a clean environment with low noise, and the student model may be trained for a noisy environment based on the information obtained from the teacher model. This results in a reduction in the word error rate (WER) for the student model over a training performed without the information provided by the teacher model.

Although improvements are gained during T/S learning, problems may still arise due to the different environments of the data in the target domain. For example, the T/S problem only implicitly address the problem of condition robustness. Here, condition refers, at least, to a particular speaker in a particular environment. By using adversarial teacher-student (AT/S) training, condition robustness is improved, e.g., the speech-recognition performance for test data from multiple conditions (e.g., noisy environments, speakers with an accent) is improved.

In some example embodiments, using AT/S, a student acoustic model and a condition classifier are jointly optimized by minimizing the Kullback-Leibler (K$\mathcal{L}$) divergence between the output distributions of the teacher and the student models, while simultaneously min-maximizing classification losses (e.g., the accuracy loss due to the acoustic condition variability) in a condition classifier. A senone-discriminative and condition-invariant deep feature is learned in the adapted student model through this procedure. Further, a multi-factorial AT/S learning is presented where the condition variabilities caused by multiple factors are minimized simultaneously.

In one embodiment, a method is provided. The method includes operations for training a teacher model based on teacher speech data and for initializing a student model with parameters obtained from the trained teacher model. The method further includes an operation for training the student model with adversarial teacher-student learning based on the teacher speech data and student speech data. Training the student model with adversarial teacher-student learning further includes minimizing a teacher-student loss that measures a divergence of outputs between the teacher model and the student model; minimizing a classifier condition loss with respect to parameters of a condition classifier, the classifier condition loss measuring errors caused by acoustic condition classification; and maximizing the classifier condition loss with respect to parameters of a feature extractor. The classifier condition loss measures errors caused by acoustic condition classification. The method further includes an operation for recognizing speech with the trained student model.

In another embodiment, a system includes a memory comprising instructions and one or more computer processors. The instructions, when executed by the one or more computer processors, cause the one or more computer processors to perform operations comprising: training a teacher model based on teacher speech data; initializing a student model with parameters obtained from the trained teacher model; training the student model with adversarial teacher-student learning based on the teacher speech data and student speech data, and recognizing speech with the trained student model. Training the student model with adversarial teacher-student learning further includes minimizing a teacher-student loss that measures a divergence of outputs between the teacher model and the student model; minimizing a classifier condition loss with respect to parameters of a condition classifier and maximizing the classifier condition loss with respect to parameters of a feature extractor.

In yet another embodiment, a machine-readable storage medium includes instructions that, when executed by a machine, cause the machine to perform operations comprising: training a teacher model based on teacher speech data; initializing a student model with parameters obtained from the trained teacher model; training the training the student model with adversarial teacher-student learning based on the teacher speech data and student speech data, and recognizing speech with the trained student model. Training the student model with adversarial teacher-student learning further includes minimizing a teacher-student loss that measures a divergence of outputs between the teacher model and the student model; minimizing a classifier condition loss with respect to parameters of a condition classifier; and maximizing the classifier condition loss with respect to parameters of a feature extractor.

FIG. 1 is an architecture of a system for implementing speech recognition, according to some example embodiments. The smart communications assistant server 118 gathers communication information from a plurality of communication sources 114, which include, at least, an email server 105, and application server 104, a user device 106, and mobile phone 106, a telecom server 108, a team-collaboration server 110, a digital assistant server 112, and so forth.

The telecom server 108 may be accessed to gather voicemails or incoming text messages, the email server 105 may be accessed to check for new emails, the application server 104 may be accessed to get application messages (e.g., Skype®, WhatsApp®), a mobile phone 106 may be accessed to get communications data downloaded to the mobile phone 106, the team-collaboration server 110 may be accessed to get communications for a collaboration tool (e.g., Slack®, Microsoft® Teams), the digital assistant server 112 may be accessed to get digital-assistant data (e.g., Microsoft®® Cortana. Amazon® Alexa, Google® Assistant, Apple® Siri), etc.

In some example embodiments, the smart communications assistant interfaces with the user via a speech device that includes, at least, one or more speakers and one or more microphones. In some cases, the speech device 102 may not include a microphone and inputs to the interface may be performed via touch or other peripheral. Examples of the speech device 102 include a smart phone, a hands-free interface in a car, the mobile phone 106, an ambient device, a headset, a headphone, etc.

The smart communications assistant provides speech recognition services for the user and may gather information to respond to the user's questions. For example, the smart communications assistant gathers messaging data from different sources, and analyzes the message data to condense the information and make it available via the speech interface. In some example embodiments, the smart communications assistant may also include other types of interfaces. For example, the smart communications assistant may present summaries to the user on a display for quick access to a summary of incoming communications when the user has access to the display.

Figure 2:
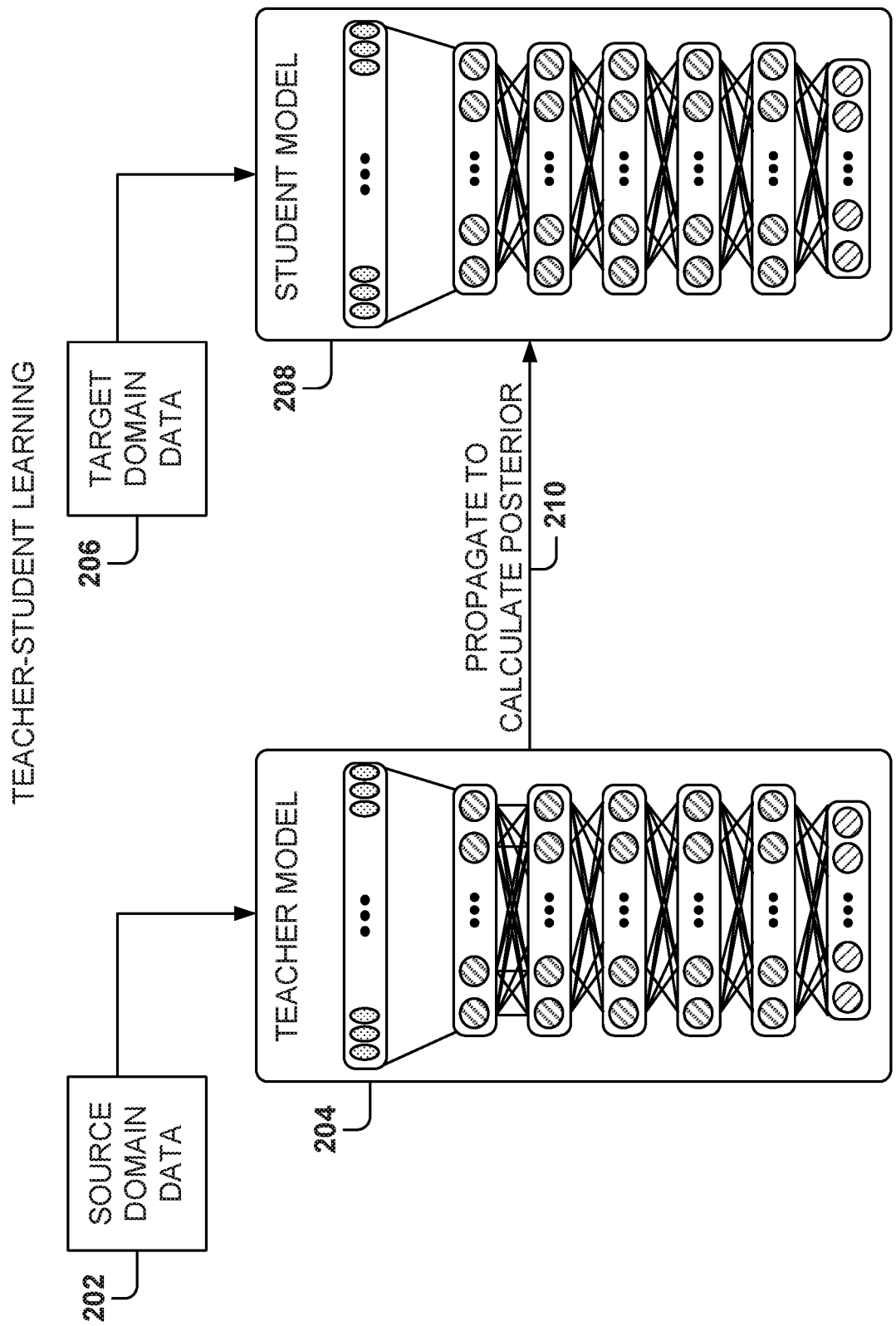
FIG. 2 illustrates the training of a student acoustic model based on the training of a teacher acoustic model, according to some example embodiments.

FIG. 2 illustrates the training of a student acoustic model based on a trained teacher acoustic model, according to some example embodiments. For ease of understanding, a few definitions are provided before describing technical details. A speech signal refers to a physical representation of spoken content in an acoustic environment. A domain is a definition of the speaker characteristics (e.g., accent, user background) and the characteristics of the acoustic environment (e.g., level of noise, distance to the microphone). Further, a condition, as used herein, refers to a particular speaker in a particular environment, such that the condition is similar to the domain, but the domain may define additional data. For example, a simple condition may be noisy data and a more sophisticated condition may be different types of noise in the noisy data.

A condition prediction may be right or wrong, and when a wrong decision is made, a loss takes place. A condition loss refers to the loss in condition classification Speech may occur in a continuous audio stream where rather stable states mix with dynamically changed states. Several classes of sounds may be defined, which are called phones. Sometimes phones are considered in context. Such phones in context are called triphones or even quinphones. For example, "a" with left phone "b" and right phone "d" in the word "bad" sounds a bit different than the same phone "a" with left phone "b" and right phone "n" in word "ban". A phoneme is one of the units of sound that distinguish one word from another in a particular language.

Each triphone is represented by a hidden Markov model (HMM) with several states. Many states of the HMMs are shared (tied together) among different triphones. A tied state in the triphone HMM is called a senone. Speech recognition scientists have identified several thousand senones into which all speech may be divided.

The acoustic model, both the teacher model and the student model, predicts the posterior probability of a certain senone. Although embodiments are presented with reference to senones, the same principles may be applied to other units of speech, such as phonemes, phones, triphones, words, etc.

In mathematical statistics, the $K\mathcal{L}$ divergence (also called relative entropy) is a measure of how one probability distribution diverges from a second probability distribution. In contrast to variation of information, $K\mathcal{L}$ divergence is a distribution-wise asymmetric measure and thus does not qualify as a statistical metric of spread. A $K\mathcal{L}$ divergence of 0 indicates that similar, or the same, behavior is expected of two different distributions, while a $K\mathcal{L}$ divergence of 1 indicates that the two distributions behave in such a different manner that the expectation given the first distribution approaches zero. In simple terms, the $K\mathcal{L}$ divergence is a measure of surprise.

The teacher model 204 and the student model 208 refer to different domains. For example, the teacher model 204 may refer to a woman's speech in a clean environment, and the student model 208 may refer to a child's speech in a noisy environment. Domain adaption is the adaptation of the source domain model (e.g., the teacher model 204) to the target domain (e.g., the student model 208). In this example, the goal is to adapt the teacher model in the domain of the woman's speech in a clean environment to the domain of the child's speech in a noisy environment. Further, a frame refers to a feature (representation) of the speech signal within a short period of time.

Referring now to FIG. 2, the teacher model 204 receives the source domain data 202 associated with the corresponding teacher domain, and the student model 208 receives the target domain data 206 associated with the corresponding student domain. In some examples, to build an adaptation system, very clean data is used (e.g., clear speaker in a clear environment without noise), and a teacher model is built for this clean domain. However, when using this teacher model in a noisy environment, performance is often bad because of the mismatch between the training and the testing environments. Therefore, domain adaptation is important to leverage the data from clean environments to noisy environments.

T/S learning is a form of transfer learning, based on the propagation 210 of posteriori probabilities in the source domain (e.g., the teacher domain) as evaluated by the teacher model. T/S learning implicitly handles the speaker and environment variability of the speech signal in the target domain without proactively addressing the robustness to conditions.

T/S learning is used to achieve unsupervised adaptation with no exposure to any transcription or decoded hypotheses of the adaptation data. In T/S learning, the posteriors generated by the teacher model are used in lieu of hard labels derived from the transcriptions to train the target-domain student model.

For unsupervised adaptation, both the T/S and the adversarial training forgo the need for any labels or decoded results of the adaptation data. T/S learning is more suitable for the situation where parallel data is available since the paired data allows the student model to be better-guided by the knowledge from the source model, while the adversarial training often provides better results when such data is not available.

Figure 3:
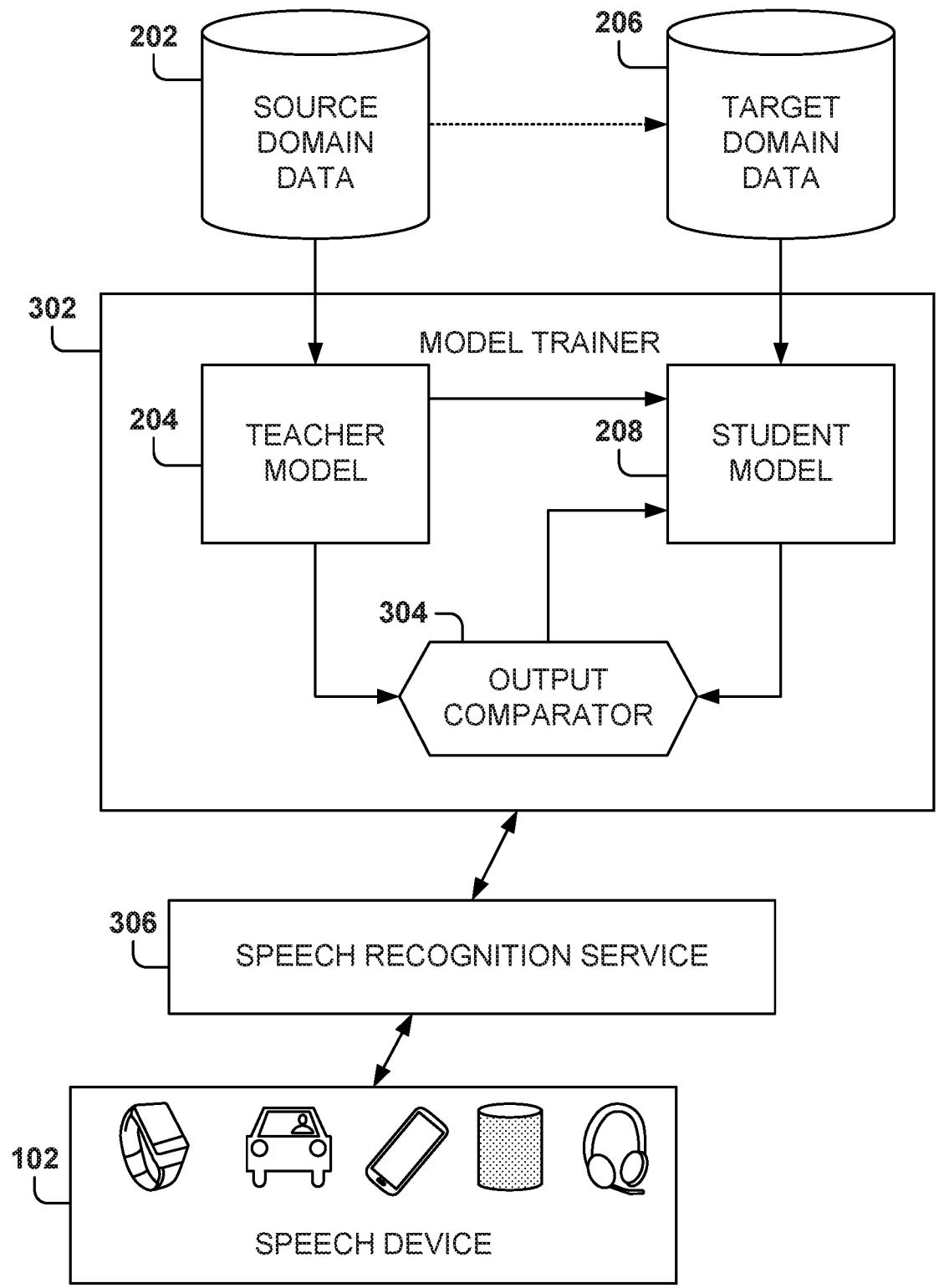
FIG. 3 illustrates the training of the student model based on the teacher model, according to some example embodiments.

FIG. 3 illustrates the training of the student model based on the teacher model, according to some example embodiments. A first speech recognition model (the teacher model) is trained to recognize speech in a first domain. The teacher model is then used as a teacher to train a second model (the student model) to recognize words received in a second domain of speech.

Therefore, the student model 208 is based on the teacher model 204 and is trained in parallel with the teacher model 204. As the teacher model 204 receives source domain data that conforms to the source domain (e.g., the teacher domain), the student model 208 is fed (in parallel) with equivalent inputs (target domain data 206) that conform to the student domain. The detection results of each model are then compared against one another and adjustments are made to the student model in light of differences in detected words or other units of speech.

As illustrated, a speech device 102 is in communication with a speech recognition service 306, associated with a model trainer 302, to develop speech recognition models for use in particular domains. The model trainer 302 receives source domain data 202 and target domain data 206 of various utterances from different domains that are fed in parallel to the teacher model 204 and the student model 208. The results from the speech recognition models 204, 208 are compared by an output comparator 304, and the differences between the two result sets are fed back into the student model 208 to update the student model 208.

The speech device 102 and the model trainer 302 are illustrative of a multitude of computing systems including, without limitation, desktop computer systems, wired and wireless computing systems, mobile computing systems (e.g., mobile telephones, netbooks, tablet or slate type computers, notebook computers, and laptop computers), hand-held devices, multiprocessor systems, microprocessor-based or programmable consumer electronics, minicomputers, printers, and mainframe computers.

In various implementations, the source domain data 202 is stored on the speech device 102, within the model trainer 302, or in a database or other computing accessible by the model trainer 302. In some embodiments, the target domain data 206 is part of a pre-existing dataset of a different domain than the source domain data 202 having parallel content.

A first domain may have a first Signal-to-Noise Ratio (SNR) and a second domain may have a second SNR. Further, the first domain may have a first mean voice frequency (e.g., utterances from adult males), the second domain may have a second mean voice frequency (e.g., utterances from adult females), and a third domain may have a third mean voice frequency (e.g., utterances from children). As will be appreciated, individual utterances may belong to several datasets (e.g., an utterance from an adult male having a first SNR), and may be designated as such via various tags or labels in a database maintaining the datasets. In other aspects, such as when a dataset for a given domain does not exist, is of insufficient size, or is otherwise not accessible by the model trainer 302, the target domain data 206 is created or supplemented from the source domain data 202 to simulate conformance with the characteristics that define the target domain.

The source domain data 202 is fed to the teacher model 204 and the target domain data 206 is fed to the student model 208 to train the student model 208 to evaluate utterances in the target domain accurately. At initiation, the teacher model 204 is fully trained for the source domain, and is cloned (e.g., copied as a new instance) to create the initial student model 208.

In one aspect, the teacher model 204 is an acoustic model trained for a baseline domain and the student model 208, for a user-specific domain, is provided to the speech device 102 for the user associated with that user-specific domain. For example, a user X, who desires speech recognition on an associated speech device 102, may contact the model trainer 302 via the speech recognition service 306, select a baseline speech recognition model that has already been trained for a given language, dialect, or accent and provide utterances (the target domain data 206) to develop a student model 208 that is specific to user X's particular speech patterns differing from the baseline model (teacher model 204). The student model 208 developed may then be provided to the speech device 102 or retained for later use as another teacher model 204. Similarly, the input utterances may be discarded or retained for later use in training.

In other embodiments, the teacher model 204 is an acoustic model trained for a given domain available for use by several speech devices 102 and the student model 208 is an acoustic model trained for a different domain that is also available for use by several speech devices 102. For example, if a new voice compression codec is developed, a new acoustic model may be trained for the dataset of utterances compressed by that codec (target domain data 206) so that speech devices 102 that employ the new codec may accurately recognize words in utterances compressed thereby. Speech devices 102 may then download a selected student model 208 or have new student models 208 uploaded thereto.

The student model 208 is trained under the supervision of the teacher model 204, which means that each model 204, 208 receives utterances in its respective domain in parallel. Parallel utterances are frame-by-frame synchronized. For example, a child saying a given word will generally use a higher mean vocal frequency than an adult saying the same word, due to adults generally having deeper voices than children.

The outputs from the speech recognition models 204, 208 are compared by the output comparator 304, and the differences or similarities in the predicted words/phonemes/senones posteriors are fed back into the student model 208 to update the student model 208, according to one of various machine learning techniques or schemes to more accurately identify speech in accord with the outputs from the teacher model 204.

Machine learning techniques train models to accurately make predictions on data fed into the models (e.g., what was said by a user in a given utterance, whether a noun is a person, place, or thing; what the weather will be like tomorrow). During a learning phase, the models are developed against a training dataset of inputs (e.g., sample A, sample B, sample C) to optimize the models to correctly predict the output for a given input. Generally, the learning phase may be supervised, semi-supervised, or unsupervised; indicating a decreasing level to which the "correct" outputs are provided in correspondence to the training inputs. In a supervised learning phase, all of the outputs are provided to the model and the model is directed to develop a general rule or algorithm that maps the input to the output. In contrast, in an unsupervised learning phase, the desired output is not provided for the inputs so that the model may develop its own rules to discover relationships within the training dataset. In a semi-supervised learning phase, an incompletely labeled training set is provided, with some of the outputs known and some unknown for the training dataset.

In the current disclosure, the training dataset inputs are provided from target domain data 206 to train the student model 208 during its learning phase, and the parallel source domain data 202 are analyzed by the teacher model 204 to compute the $K\mathcal{L}$ divergence between the teacher and student output distributions.

Models may be run against a training dataset for several epochs (e.g., iterations), in which the training dataset is repeatedly fed into the model to refine its results. For example, in a supervised learning phase, a model is developed to predict the output for a given set of inputs, and is evaluated over several epochs to more reliably provide the output that is specified as corresponding to the given input for the greatest number of inputs for the training dataset. In another example, for an unsupervised learning phase, a model is developed to cluster the dataset into n groups, and is evaluated over several epochs as to how consistently it places a given input into a given group and how reliably it produces the n desired clusters across each epoch.

Once an epoch is run, the models are evaluated and the values of their variables are adjusted to attempt to better refine the model in an iterative fashion. In various aspects, the evaluations are biased against false negatives, biased against false positives, or evenly biased with respect to the overall accuracy of the model. The values may be adjusted in several ways depending on the machine learning technique used. For example, in a genetic or evolutionary algorithm, the values for the models that are most successful in predicting the desired outputs are used to develop values for models to use during the subsequent epoch, which may include random variation/mutation to provide additional data points. One of ordinary skill in the art will be familiar with several other machine learning algorithms that may be applied with the present disclosure, including linear regression, random forests, decision tree learning, neural networks, deep neural networks, etc.

Each model develops a rule or algorithm over several epochs by varying the values of one or more variables affecting the inputs to more closely map to a desired result, but as the training dataset may be varied, and is preferably very large, perfect accuracy and precision may not be achievable. A number of epochs that make up a learning phase, therefore, may be set as a given number of trials or a fixed time/computing budget, or may be terminated before that number/budget is reached when the accuracy of a given model is high enough or low enough or an accuracy plateau has been reached. For example, if the training phase is designed to run n epochs and produce a model with at least 95% accuracy, and such a model is produced before the $n^{th}$ epoch, the learning phase may end early and use the produced model satisfying the end-goal accuracy threshold. Similarly, if a given model is inaccurate enough to satisfy a random chance threshold (e.g., the model is only 55% accurate in determining true/false outputs for given inputs), the learning phase for that model may be terminated early, although other models in the learning phase may continue training. Similarly, when a given model continues to provide similar accuracy or vacillate in its results across multiple epochs—having reached a performance plateau—the learning phase for the given model may terminate before the epoch number/computing budget is reached.

Once the learning phase is complete, the models are finalized. In some example embodiments, models that are finalized are evaluated against testing criteria. In a first example, a testing dataset that includes known outputs for its inputs is fed into the finalized models to determine an accuracy of the model in handling data that is has not been trained on. In a second example, a false positive rate or false negative rate may be used to evaluate the models after finalization. In a third example, a delineation between data clusterings is used to select a model that produces the clearest bounds for its clusters of data.

While the speech device 102, model trainer 302, and data sources 202, 206 are shown remotely from one another for illustrative purposes, it should be noted that several configurations of one or more of these devices hosted locally to another illustrated device are possible, and each illustrated device may represent multiple instances of that device.

The acoustic models 204, 208 receive utterances from the speech device 102 and, during a training phase, form the domain data 202, 206 to identify the various phonemes and senones (including silences) present in the utterance, thus producing phonetic representations of the utterance at a frame level. The recognized phonemes are used in various embodiments to determine what the speaker is saying in an utterance, for example, to determine whether a key phrase is present, to identify the content of a command or query, etc.

In some aspects, the phonetic representations for the frames are produced from posterior features for each frame f that provide statistical likelihoods that the frame f is generated by various phonemes/senones. The posteriors for the student model 208 during the training phase use initial weights that are supplied from the teacher model 204.

In some example embodiments, the student model 208 includes, or is trained by, a neural network (e.g., deep learning, deep convolutional, or recurrent neural network), which comprises a series of "neurons." such as Long Short Term Memory (LSTM) nodes, arranged into a network. A neuron is an architectural element used in data processing and artificial intelligence, particularly machine learning, that includes memory that may determine when to "remember" and when to "forget" values held in that memory based on the weights of inputs provided to the given neuron. Each of the neurons used herein are configured to accept a pre-defined number of inputs from other neurons in the network to provide relational and sub-relational outputs for the content of the frames being analyzed. Individual neurons may be chained together and/or organized into tree structures in various configurations of neural networks to provide interactions and relationship learning modeling for how each of the frames in an utterance are related to one another.

For example, an LSTM serving as a neuron includes several gates to handle input vectors (e.g., phonemes from an utterance), a memory cell, and an output vector (e.g., contextual representation). The input gate and output gate control the information flowing into and out of the memory cell, respectively, whereas forget gates optionally remove information from the memory cell based on the inputs from linked cells earlier in the neural network. Weights and bias vectors for the various gates are adjusted over the course of a training phase, and once the training phase is complete, those weights and biases are finalized for normal operation. One of skill in the art will appreciate that neurons and neural networks may be constructed programmatically (e.g., via software instructions) or via specialized hardware linking each neuron to form the neural network.

Neural networks utilize features for analyzing the data to generate assessments (e.g., recognize units of speech). A feature is an individual measurable property of a phenomenon being observed. The concept of feature is related to that of an explanatory variable used in statistical techniques such as linear regression. Further, deep features represent the output of nodes in hidden layers of the deep neural network.

By using T/S learning for unsupervised adaption, the goal is to learn a student acoustic model that can accurately predict the senone posteriors of the target-domain data from a well-trained source-domain teacher acoustic model. To achieve this, two sequences of unlabeled parallel data are needed. e.g., an input sequence of source-domain speech frames to the teacher model $X^T = \{x_1^T, \ldots, x_N^T\}$ and an input sequence of target-domain speech frames to the student model $X^S = (x_1^S, \ldots, x_N^S)$. $X^T$ and $X^S$ are parallel to each other. e.g., each pair of $x_i^S$ and $x_i^T$, for i–1 . . . N, are frame-by-frame synchronized.

In some example embodiments, T/S learning aims at minimizing the K$\mathcal{L}$ divergence between the output distributions of the teacher model and the student model by taking the unlabeled parallel data $X^T$ and $X^S$ as the input to the models. The K$\mathcal{L}$ divergence between the teacher output distribution $p_{T(q|x_i^T;\theta_T)}$ and the student output distribution and $p_{S(q|x_i^S;\theta_s)}$ is calculated as follows:

$$K\mathcal{L}(p_T \| p_S) = \sum_i \sum_{q \in Q} p_T(q|x_i^T; \theta_T) \log\left(\frac{p_T(q|x_i^T; \theta_T)}{p_S(q|x_i^S; \theta_S)}\right) \quad (1)$$

Where q is one of the senones in the senone set Q, i is the frame index, $\theta_T$ is the parameters of the teacher model, and $\theta_S$ is the parameters of the student models.

Over successive epochs of training of the student model 208, the weights applied to various inputs are adjusted to minimize the divergence score between the two speech recognition models 204, 208. As will be appreciated, only the parameters of the student model 208 are adjusted during the student model training.

One goal is for the student network to behave the same as the teacher network by having the student and the teacher network produce similar probability distributions. If the models behave the same, then the distributions will be the same, or similar. If the distributions are identical, then the result of the log operation will be zero. The goal is to change θS (the parameters of the student network) to obtain a K $\mathcal{L}$ as small as possible.

To learn a student network that approximates the given teacher network, the K$\mathcal{L}$ divergence is minimized with respect to the parameters of the student network while keeping the parameters of the teacher model fixed, which is equivalent to minimizing the student loss function $\mathcal{L}(\theta_S)$ as follows:

$$\mathcal{L}(\theta_S) = -\Sigma_i \Sigma q \epsilon Q\, p_T(q|x_i^T;\theta_T)\log p_S(x_i^S;\theta_S) \quad (2)$$

The target domain data used to adapt the student model is usually recorded under multiple conditions, i.e., the adaptation data often comes from a large number of different talkers speaking under various types of environments (e.g., home, bus, restaurant). T/S learning may implicitly handle the inherent speaker and environment variability in the speech signal, and the T/S robustness may be improved by explicitly handling the condition invariance.

In some example embodiments, because the inputs are provided in parallel, no labeling of the inputs is required (i.e., neither the source domain data 202 nor the target domain data 206 need to be labeled; both may be un-transcribed) and the training of the student model 208 may make use of an unlimited amount of training data. Because no labels are needed, for either of the domains when simulating the target domain data 206, large amounts of parallel data may be generated from existing source domain data 202, which are used to make the behavior of the student model 208 for the target domain converge to that of the teacher model 204 for the source domain for which it was trained.

Figure 4:
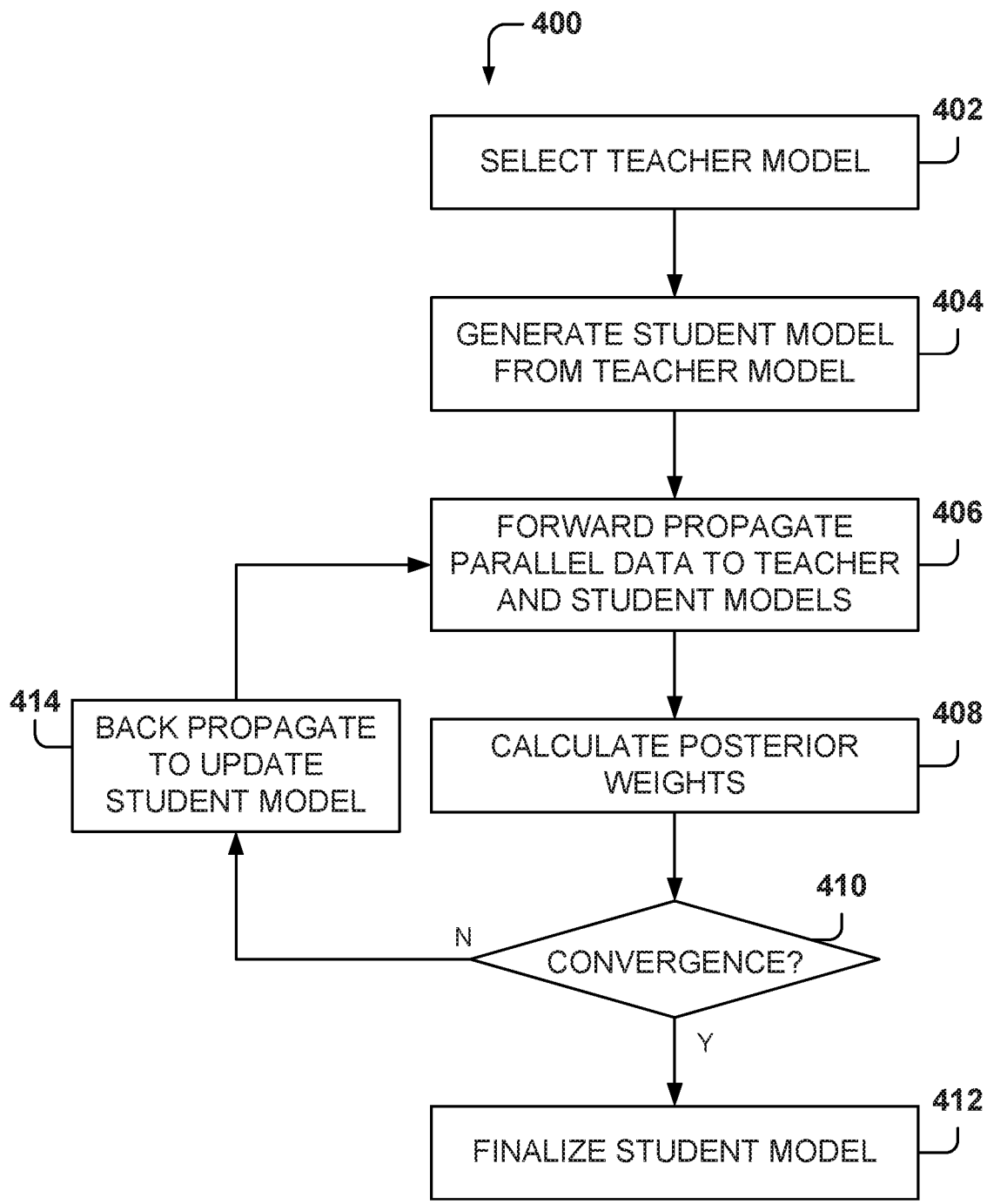
FIG. 4 is flowchart of a method for student-teacher training, according to some example embodiments.

FIG. 4 is flowchart of a method 400 for student-teacher training, according to some example embodiments. At operation 402, an already trained teacher model 204, associated with a dataset of source domain data 202, is selected. In some example embodiments, the teacher model 204 is selected based on a language, a dialect, an accent pattern, or the like.

Proceeding to operation 404, an initial student model 208 is generated based on the teacher model 204. In some example embodiments, the initial student model 208 is a clone of the teacher model 204, wherein the weights of the student neural network are initialized with the weights of the teacher model 204. As will be appreciated, those weights of the student model 208 are modified from their initial values or layouts to more accurately recognize speech in the domain for which the student model 208 is adapted by minimizing the divergence score calculated between the posteriors generated by the teacher model 204 and the student model 208.

The source domain data 202 and the target domain data 206 are forward propagated to the teacher model 204 and the student model 208, respectively, at operation 406. In some example embodiments, the target domain data 206 and associated source domain data 202 are forward propagated, while in other aspects a sub-set or batch of the target domain data 206 and associated source domain data 202 are forward propagated. In successive iterations of the student model 208 training, the successive parallel batches are fed to the teacher model 204 and the student model 208 to produce successive posteriors, which will be compared again against one another until a maximum number of epochs is reached, the divergence score satisfies a convergence threshold, divergence plateaus, or training is manually stopped.

The teacher model 204 and the student model 208 are fed the data in parallel from their associated domains to recognize sounds in the data as components of speech and/or as individual words. These components are calculated as posteriors at operation 408, in which the probabilities that a given frame of an utterance contains a given senone/phoneme are calculated, including probabilities that a given frame includes silences or otherwise lacks human speech. In various embodiments, a highest-probability senone/phoneme for a given frame is indicated or is provided as the only output for a given frame by each model, while in other embodiments all the probabilities for the potential senones/phonemes are output by the models.

At operation 410, a check is made to determine if the behavior of the student model 208 converges with the behavior of the teacher model 204. In some example embodiments, the convergence is calculated as the K $\mathcal{L}$ divergence as shown in equation (1), but other types of divergence scores may be utilized. A divergence score converging below a convergence threshold indicates that the student model 208 is able to recognize speech in its given domain almost as well as the teacher model 204 is able to recognize speech in its domain. The divergence score not satisfying the convergence threshold indicates that the student model 208 has not yet converged with the teacher model 204, and adjustment to the student model 208 parameters is required.

As will be appreciated, the student model 208 may be more or less accurate than the teacher model 204 in some cases for accurately recognizing speech, but the student model 208 is judged based on the similarity of its results to the results of the teacher model 204. As will also be appreciated, convergence may also occur when a maximum number of training rounds have occurred, a divergence plateau is reached, or when a user manually terminates training early.

In response to determining that the student model 208 has not converged relative to the teacher model 204, method 400 proceeds to operation 414. At operation 414, the results from the teacher model 204 and the student model 208 are back propagated to the student model 208 to update the parameters of the student model 208 in light of the divergent results. As will be appreciated, various machine learning techniques may be used to update the student model 208 in light of the results. Once the student model is updated, the method 400 returns to operation 406 to feed the teacher model 204 and the updated student model 208 parallel data from their associated domains. As will be appreciated, subsequent executions of operation 406 may use the same or different (successive) data from the source domain data 202 and the target domain data 206.

In response to determining that the student model 208 has converged relative to the teacher model 204, method 400 proceeds to operation 412, where the student model 208 is finalized. Finalizing the student model 208 locks in the values (weights and thresholds) and structures (e.g., node connections in a neural network) of the speech recognition model. Once finalized, the student model 208 may be transmitted to a user device 110 or to the speech recognition service 306 for speech recognition thereon, be used as a teacher model 204 for training a new student model 208, or undergo further testing or analysis.

Figure 5:
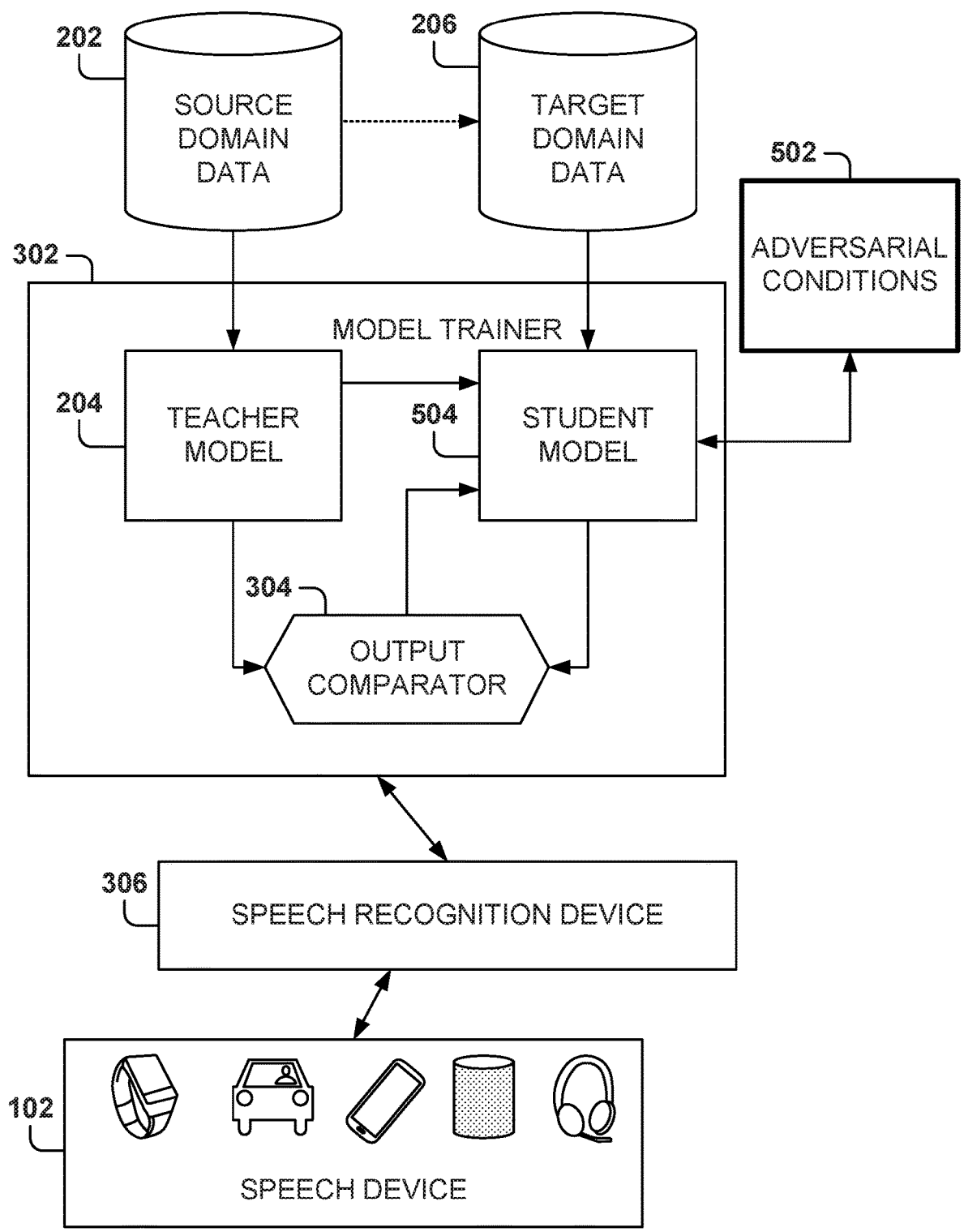
FIG. 5 illustrates adversarial teacher-student learning according to some example embodiments.

FIG. 5 illustrates AT/S learning according to some example embodiments. Although the T/S framework may perform domain transform, there may still be some speech-recognition problems, such as recognizing speech in the target domain (e.g., the student model). For example, there may data corresponding to different types of noise or different types of speakers. With adversarial training, the variance for the different conditions is minimized to improve speech recognition.

Adversarial conditions 502 are added during the student model 504 training to improve the results under different conditions. As used herein, learning with adversarial conditions means to simultaneously aim at minimizing one loss while maximizing another loss. In some example embodiments, the adversarial conditions refer to the classifier condition loss being minimized with respect to one parameter and maximized with respect to another parameter, described in more detail below with reference to FIG. 6.

T/S learning is improved with adversarial T/S training for condition-robust, unsupervised domain adaptation, where a student acoustic model and a condition classifier are jointly trained to minimize the K$\mathcal{L}$ divergence between the output distributions of the teacher and the student models. Additionally, the classifier condition loss 604 is min-maximized (e.g., minimized with respect to one parameter and maximized with respect to another parameter) through adversarial multi-task learning. A senone-discriminative and condition-invariant deep feature is learned in the adapted student model with AT/S.

At a high level, the adversarial method is a training method that optimizes objectives in two different directions. A condition classifier is a machine-learning program (e.g., neural network) used to predict (e.g., classify) the condition label (e.g., weather it is clean or noisy, or which kind of noise is present). The condition classifier is added on top of the deep features represented as the node outputs of one layer of the neural network. The feature extractor of the student model and the condition classifier are trained in a competitive fashion: the classifier condition loss is being maximized with respect to the feature extractor while the classifier condition loss is being minimized with respect to the condition classifier.

In some example embodiments, a multi-factorial adversarial (MFA) T/S learning is used when the condition variabilities caused by multiple factors are minimized simultaneously.

Figure 6:
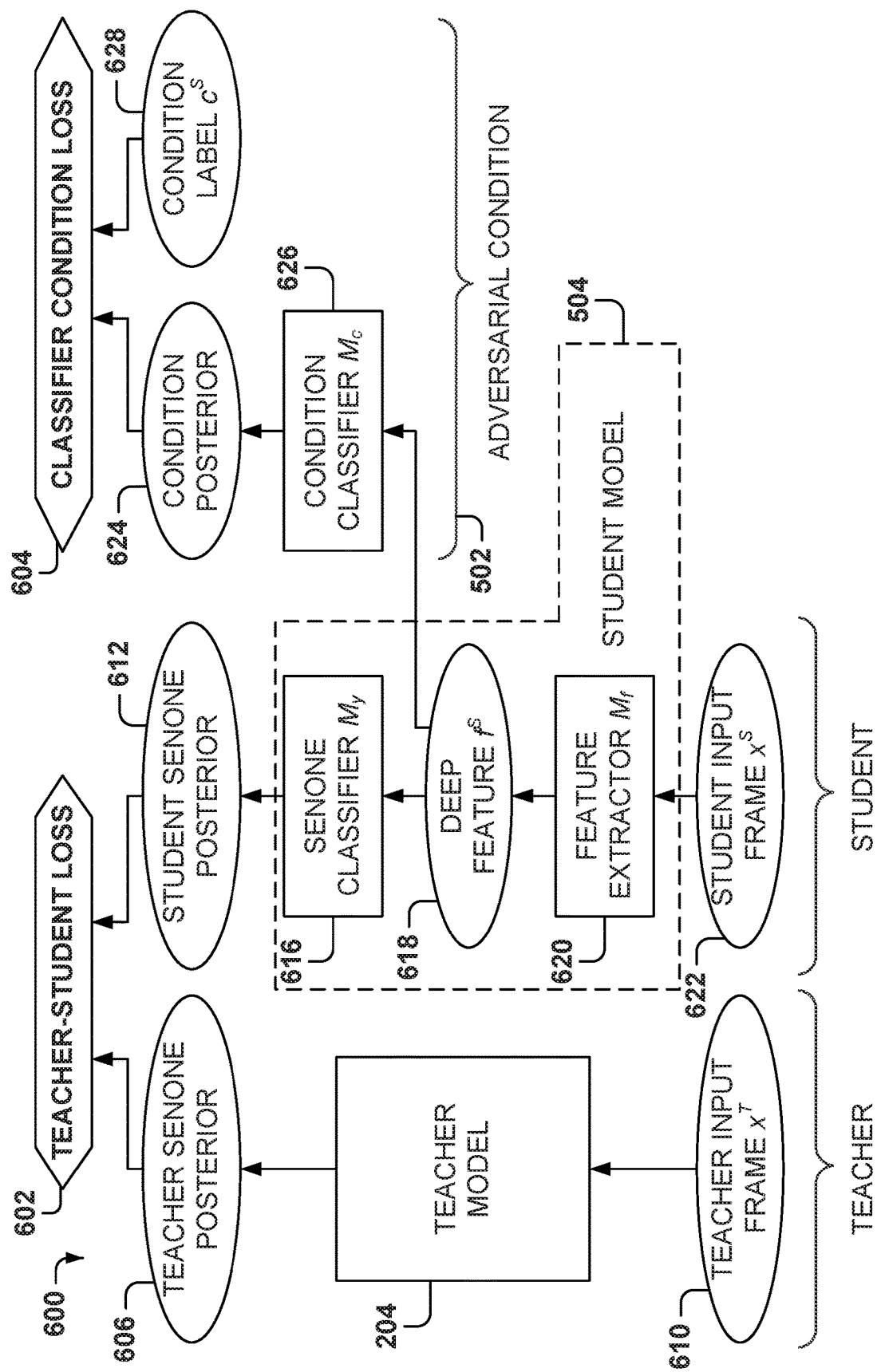
FIG. 6 is a flowchart illustrating the training of the student model with an adversarial constraint, according to some example embodiments.

FIG. 6 is a flowchart illustrating the training of the student network with adversarial constraints, according to some example embodiments. With AT/S, two types of losses are calculated: a teacher-student loss 602 and a classifier condition loss 604. The teacher-student loss 602, also referred to as the senone loss, is the divergence (e.g., K$\mathcal{L}$) between the teacher senone posterior 606 and the student senone posterior 612.

Because AT/S learning is being used, the teacher-student loss 602 is minimized while the classifier condition loss 604 is maximized with respect to the feature extractor and minimized with respect to the condition classifier. The "adversarial" term in AT/S is because the classifier condition loss 604 objective is optimized simultaneously in opposite directions for different parameters.

In general terms, a good reading signal is desired for each of the inputs for the teacher and the student networks (teacher input frame $X^T$ 610 and student input frame $X^S$ 622) to obtain the desired output. In this case, the desired output is produced by the teacher and the student model aims at obtaining the desired output indicated by the teacher. The teacher network has already been trained to generate the optimized teacher model 204.

The left column in the method 600 refers to the teacher, the column next to it corresponds to the student, and the two columns on the right are associated with the adversarial condition 502.

The teacher input frame $X^T$ 610 is the observations (e.g., speech) received for the teacher model and the student input frame $X^S$ 622 is the observations received for the student model. For example, in a very noisy in-car situation, the word "hello."

Thus, in some example embodiments, the teacher produces clean output and the student gets the noisy input (e.g., the noisy condition). However, the output (the teacher-student loss 602) is meant to say, "Student, no matter what you hear, you need to produce the same output as the teacher tells you." It does not matter if the student "hears" noisy speech, the student model 504 needs to produce the same output as the teacher model 204.

There may be many different models with a deep feature $f^S$ 618 that meets the T/S constrains. What is needed is, from all the possible student models 504, choose the one (or one of the possible ones) that can map the input frames to deep features $f^S$ 618 that are bad at telling the condition difference, i.e., are insensitive to noise or speaker. This is the reason for the adversarial condition: to select the student model that is insensitive to the condition. If a student model generates deep features that help differentiate the classifier condition loss 603, then that student model 504 is not desired.

In other words, the deep feature $f^S$ 618 should be senone-discriminative to produce a small senone loss and also needs to maximize the condition loss to suppress the condition difference. A high classifier condition loss 604 means that the student network is not able to differentiate among the different conditions. This means that the desired $f^S$ is good at discriminating among different senones but not good at discriminating among different conditions. The classifier condition loss 604 is minimized with respect to the condition classifier $M_c$ 626, and, at the same time, the classifier condition loss 604 is maximized with respect to the feature extractor $M_f$ 620.

The AT/S process may be described, at a high level, as follows:

1. Observe the lower layers of the student network as a feature extractor $M_f$ 620 that maps input speech frames $X^S$ 622 into deep features $f^S$ 618. Further, the upper layer of the student model 504 includes as a senone classifier $M_y$ 616 that maps $f^S$ 618 to the student senone posterior 612. It is noted that although a senone classifier is presented, the classifier 616 may utilize other units of speech in other embodiments. For example, the units of speech may be any of a senone, a phoneme, a tri-phone, a syllable, a character, a part of a word, a word, etc.

2. Perform adversarial training of the condition classifier $M_c$ 626 (e.g., a deep neural network (DNN)) that maps the deep feature $f^S$ 618 to its condition label $c^S$ 628 and the feature extractor 620 in the student model, in order to minimize the classifier condition loss 604 with respect to the condition classifier $M_c$ 626, while simultaneously maximizing the classifier condition loss 604 with respect to the feature extractor $M_f$ 620.

3. Minimize the senone classification loss of the student model with respect to the senone classifier and the feature extractor to ensure the senone-discriminativeness of the deep feature. The posteriors generated by the teacher model are used in lieu of the hard labels derived from the transcriptions to compute the senone classification loss.

4. For AT/S learning, perform adversarial training of the condition classifier DNN that map the deep feature $f^S$ 618 to its condition labels $c^S$ 628 and the feature extractor $M_f$ 620 in the student model 504. The condition labels $c^S$ 628 define the parameters of the condition (e.g., level of noise, speaker, inside a car, etc.)

In some example embodiments, sub-networks are jointly optimized using stochastic gradient descent (SGD). The optimized feature extractor $M_f$ 620 and the senone classifier $M_y$ 616 form the adapted acoustic model for robust speech recognition.

With AT/S learning, similar to the T/S learning, the student model 504 (also referred to as the student acoustic model) is cloned from the teacher model 204 and unlabeled parallel data is used as the input to adapt the student model 504. To achieve condition-robustness, a condition-invariant and senone-discriminative deep feature $f^S$ 618 is learned in the adapted student model 504 through the teacher senone posteriors 606 generated by the teacher model and the condition label for each frame. To do so, the first few layers of the acoustic model are used as a feature extractor 620 with parameters $\theta_f$ that maps input speech frames $X^S$ of different conditions to deep intermediate features $F^S = \{f_1^S, \ldots, f_N^S\}$ and the upper layers of the student network as a senone classifier 616 $M_y$ with parameters $\theta_y$ that map the intermediate features $F^S$ to the senone posteriors $p_S(q|f_i^S; \theta_y)$, $q \in Q$ as follows:

$$M_y(f_i^S) = M_y(M_f(x_i^S)) = p_S(q|x_i^S;\theta_f,\theta_y) \quad (3)$$

Where $\theta_S = \{(\theta_f, \theta_y)\}$ defines the student model. Further, $\theta_f$ is the parameter set for feature extractor $M_f$ 620 and $\theta_y$ is the parameter set for senone classifier $M_y$ 616.

Equation (3) above describes the senone classifier $M_y$ 616, which takes $f^S$ 618 and outputs the student senone posterior 612. The student model 504 may be described as a series of linear and non-linear transforms with the input being a matrix of vectors that go through a series of linear and non-linear transforms.

A condition classifier network $M_c$ 626 maps the deep features $f^S$ 618 to the condition posteriors 624 $p_c(a|x_i^S; \theta_c, \theta_f)$, $a \in A$ as follows:

$$M_c(M_f(x_i^S)) = p_c(a|x_i^S;\theta_c,\theta_f) \quad (4)$$

Where a is one condition in the set of all conditions A, and $\theta_c$ is a set of parameters for conditions classifier $M_c$ 626. $M_c$ 626 has the same input (a deep feature $f^S$ 618) as $M_y$ 616. However, $M_c$ 626 makes different predictions based on the same $f^S$ 618. Thus, $M_c$ 626 predicts the condition posterior 624 based on $f^S$ 618. This means, for example, that given a deep feature $f^S$ 618, $M_c$ 626 predicts the domain, e.g., speaker it belongs to, a noisy condition.

To make the deep features $F^S$ condition-invariant, the distributions of the features from different conditions should be as close to each other as possible. Therefore, the $M_f$ 620 and $M_c$ 626 are jointly trained with an adversarial objective, in which $\theta_f$ is adjusted to maximize the classifier condition loss $\mathcal{L}_{condition}^f(\theta^f, \theta_c)$ 604 while $\theta_c$ is adjusted to minimize the classifier condition loss $\mathcal{L}_{condition}^f(\theta_f, \theta_c)$ 604, which is calculated as follows:

$$\mathcal{L}_{condition}^f(\theta_f, \theta_c) = -\sum_i^N \log p_c(c_i^S | x_i^S; \theta_f, \theta_c) = \quad (5)$$

$$= -\sum_i^N \sum_{a \in A} 1_{[a=c_i^S]} \log M_c(M_f(x_i^S))$$

Where $c_i^S$ denotes the condition label 628 for the input frame $x_i^S$ of the student model. This mini-max competition will first increase the discriminative capability of $M_c$ 626 and the condition-invariance of the features generated by $M_f$ 620 and will eventually converge to the point where $M_f$ 620 generates extremely confusing features that $M_c$ 626 is unable to distinguish.

At the same time, T/S learning is used to let the behavior of the student model 504 in the target domain approach the behavior of the teacher model 204 in the source domain by minimizing the K$\mathcal{L}$ divergence (e.g., the teacher-student loss 602) of the output distributions between the student and teacher acoustic models. By combining equations (2) and (3), minimizing the loss function in equation (2) may be re-formulated as follows:

$$\mathcal{L}_{TS}(\theta_f, \theta_y) = \Sigma_i \Sigma_{q \in Q} p_T(q | x_i^T; \theta_f, \theta_y) M_y(M_f(x_i^S)) \quad (6)$$

$\mathcal{L}_{TS}(\theta_f, \theta_y)$ is the teacher-student loss. In AT/S learning, the student network and the condition classifier network are trained to jointly optimize the primary task of T/S learning using soft targets from the teacher model and the secondary task of condition classification with an adversarial objective function. Therefore, the total loss $\mathcal{L}_{total}(\theta_f, \theta_y, \theta_c)$ is calculated as follows:

$$\mathcal{L}_{total}(\theta_f, \theta_y, \theta_c) = \mathcal{L}_{TS}(\theta_f, \theta_y) - \lambda \mathcal{L}_{condition}^f(\theta_f, \theta_c) \quad (7)$$

Where $\lambda$ is a tuning parameter (e.g., a hyperparameter) that controls the trade-off between the two losses of equations (5) and (6). Thus, the total loss $\mathcal{L}_{total}(\theta_f, \theta_y, \theta_c)$ is a sum of the losses that are to be optimized together. The minus sign for $\mathcal{L}_{condition}^f(\theta_f, \theta_c)$ 604 is because of the adversarial training as it is desired to maximize the loss with respect to the $\theta_f$ condition, the parameter set of feature extractor $M_f$ 620.

Further, the optimal parameters $\hat{\theta}_y, \hat{\theta}_f$ and $\hat{\theta}_c$ for $\theta_y, \theta_f$, and $\theta_c$, respectively, are searched such that:

$$(\hat{\theta}_f, \hat{\theta}_y) = \min_{\theta_y, \theta_f} \mathcal{L}_{total}(\theta_f, \theta_y, \hat{\theta}_c) \quad (8)$$

$$\hat{\theta}_c = \max_{\theta_c} \mathcal{L}_{total}(\hat{\theta}_f, \hat{\theta}_y, \theta_c) \quad (9)$$

In some example embodiments, stochastic gradient descent (SGD) is used to optimize $\mathcal{L}_{total}(\theta_f, \theta_y, \theta_c)$. SGD, also known as incremental gradient descent, is a stochastic approximation of the gradient descent optimization and iterative method for minimizing an objective function that is written as a sum of differentiable functions. In other words, SGD tries to find minima or maxima by iteration.

Using SGD, the $\theta$ parameters are updated for each iteration via back propagation through time as follows:

$$\theta_f \leftarrow \theta_f - \mu \left[ \frac{\partial \mathcal{L}_{TS}}{\partial \theta_f} - \alpha \frac{\partial \mathcal{L}_{condition}}{\partial \theta_f} \right] \quad (10)$$

$$\theta_c \leftarrow \theta_c - \mu \frac{\partial \mathcal{L}_{condition}}{\partial \theta_c} \quad (11)$$

$$\theta_y \leftarrow \theta_y - \mu \frac{\partial \mathcal{L}_{TS}}{\partial \theta_y} \quad (12)$$

Where $\mu$ is the learning rate. It is noted that the negative coefficient for $\alpha$ in equation (10) induces a reversed gradient that maximizes $\mathcal{L}_{condition}(\theta_f, \theta_c)$ in equation (5) and makes the deep feature condition-invariant. The gradient reversal layer acts as an identity transform in the forward propagation and multiplies the gradient by $-\lambda$ during the backward propagation. In equation (7), the terms within the square brackets respond to the gradient from the senone and part of the condition loss.

The student network gets updated iteratively until convergence is reached to find the optimized student model. The optimized student network, consisting of $M_f$ and $M_c$, is used as the adapted acoustic model for ASR in the target-domain.

Multi-Factorial Adversarial Teacher-Student Learning

Speaker and environment are two of the factors that contribute to the inherent variability of the speech signal. FIG. 6 illustrates AT/S learning to reduce the variations induced by a single condition. The method 600 may be expanded to solve the condition variability problem to include multiple factors, a process referred to as multi-factorial adversarial teacher-student learning MFAT/S, where multiple factors that cause the condition variability are suppressed simultaneously through adversarial multi-task learning.

For example, in the target speech there may be two factors. First factor corresponding to the speaker and second factor corresponding to a noisy condition (e.g., clean, noisy, very noisy).

With MFAT/S, the senone classifier $M_y$ and the feature extractor $M_f$ are the same as in AT/S, but additional R condition classifiers $M_c^r$, $r=1, \ldots, R$ are introduced. Each $M_c^r$ maps the corresponding deep feature to the posteriors of the $p^{th}$ condition. To make the deep features $F^S$ condition-invariant to each factor, $M^f$ and $M^c$ are jointly trained with an adversarial objective, in which $\theta_f$ is adjusted to maximize the total classifier condition loss of all factors while $\theta_c^r$ is adjusted to minimize the total classifier condition loss of all factors.

At the same time, the K$\mathcal{L}$ divergence between the output distributions of the teacher and the student models is minimized. The total loss function $\mathcal{L}_{total}(\theta_f, \theta_y, \theta_c^1, \ldots, \theta_c^R)$ for MFAT/S learning is formulated as follows:

$$\mathcal{L}_{total}(\theta_f, \theta_y, \theta_c^1, \ldots, \theta_c^R) = \mathcal{L}_{TS}(\theta_f, \theta_y) - \lambda \Sigma_{r=1}^R \mathcal{L}_{condition}^r(\theta_c^r, \theta_f) \quad (13)$$

Where $\mathcal{L}_{TS}(\theta_f, \theta_y)$ is defined in equation (6). Further, $\mathcal{L}_{condition}^r$ for each r is formulated in the same way as in equation (5). Thus, equation (13) is used for MFAT/S instead of equation (7) for AT/S.

The parameters are optimized in the same way as in equations (8) to equation (12). It is noted that better performance may be obtained when the condition losses have different combination weights. However, they are equally added together in equation (13) to avoid tuning. In other example embodiments, different weights for the different condition losses may be utilized to tune goals for the different factors.

Figure 7:
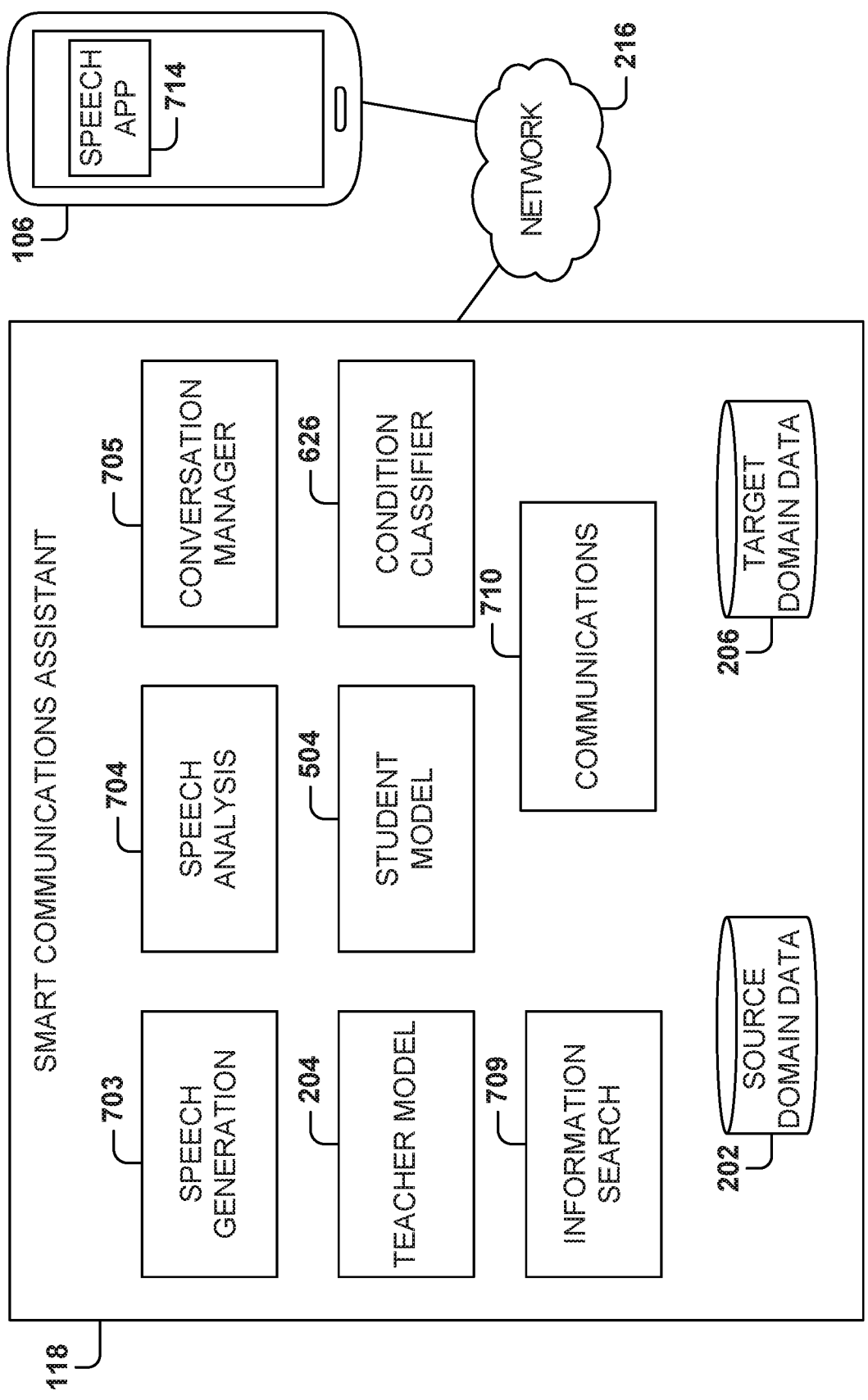
FIG. 7 illustrates the modules of the smart communications assistant, according to some example embodiments.

FIG. 7 illustrates the modules of the smart communications assistant, according to some example embodiments. In some example embodiments, the smart communications assistant 118 includes several modules which may be implemented in hardware, software (e.g., programs), or a combination thereof. The modules include a speech generation module 703, a speech analysis module 704, a conversation manager 705, a teacher model 204, a student model 504, a condition classifier 626, an information search module 709, a communications module 710, and one or more databases. The databases may include a source domain data database 202 for storing the source domain data 202, and a target domain data database 206 for storing the target domain data 206.

The speech generation module 703 converts text to speech for presentation to the user. The speech analysis module 704 receives audio (e.g., user speech) and converts the audio to text, e.g., performs voice recognition. The conversation manager 705 provides an interactive interface for the user based on plane-language communications. The conversation manager 705 is able to analyze user language to convert the language into commands for the smart communications assistant 118.

The teacher model 204 performs the operations related to the teacher network, including the training of the teacher model. The student model 504 performs the operations related to the student network, including the training of the student model based on the training of the teacher model, as described above with reference to FIGS. 2-6.

The communications module 710 provides communications capabilities to the smart communications assistant 118 for connecting, to the user or to sources of information, via network 216.

In some example embodiments, an application may be installed on a user device, such as speech app in mobile phone 106, to interact with the smart communications assistant 118 and with the user. In some example embodiments, the speech app 714 may be integrated with the operating system of the device. Another example embodiments, the smart communications assistant 118 may be accessed via a browser or some other app installed on the device. In some example embodiments, some of the functions described above for the smart communications assistant 118 are performed, all or in part, by the speech app 314.

It is noted that the embodiments illustrated in FIG. 7 are examples and do not describe every possible embodiment. Other embodiments may utilize different modules, additional modules, combine the functionality of modules into a single module, fewer modules, distribute the functionality across multiple servers, etc. The embodiments illustrated in FIG. 7 should therefore not be interpreted to be exclusive or limiting, but rather illustrative.

Figure 8:
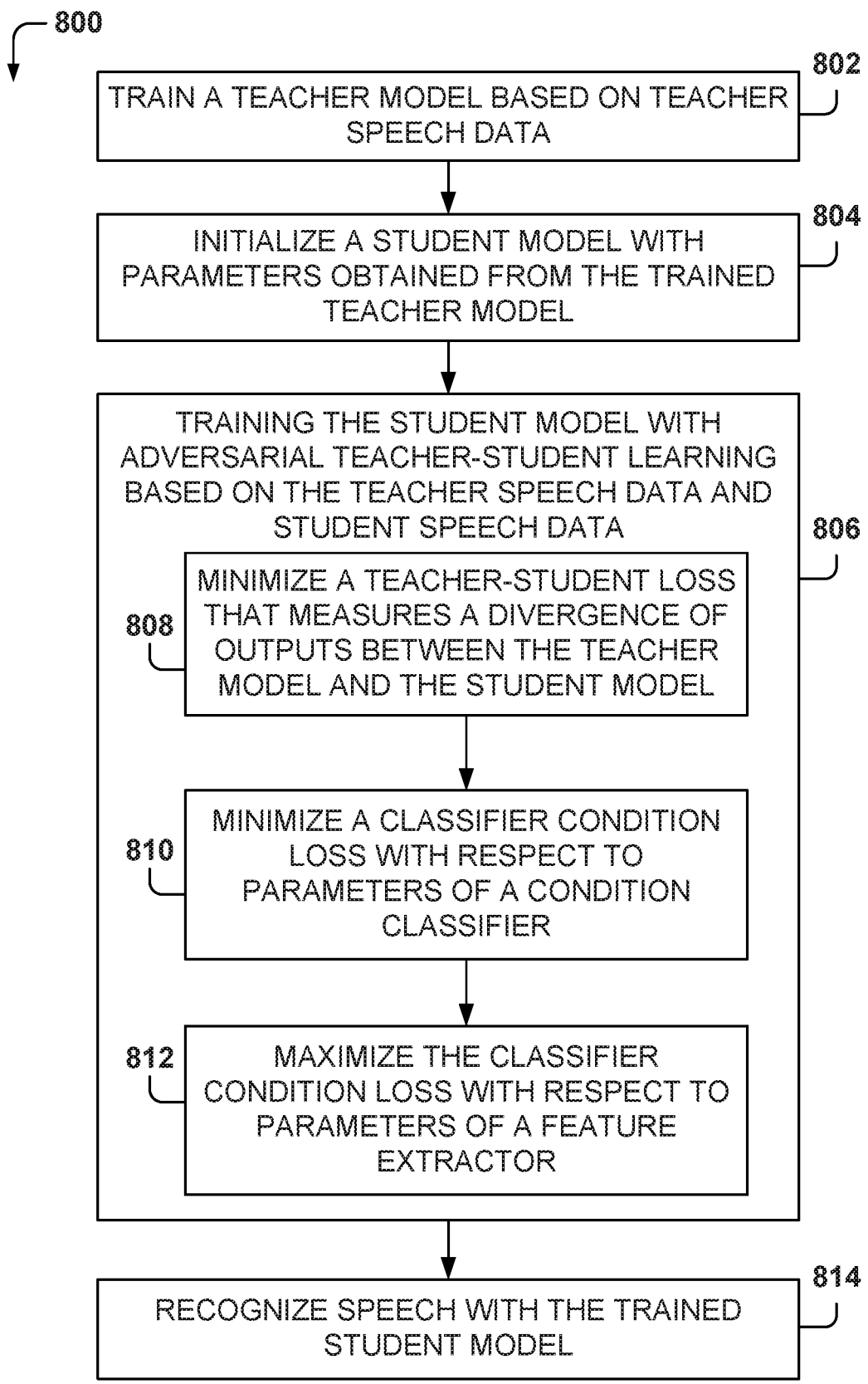
FIG. 8 is a flowchart of a method for training, with the adversarial constraint, a student model for speech recognition based on the teacher model, according to some example embodiments.

FIG. 8 is a flowchart of a method 800 for training, with adversarial constraints, a student network for speech recognition based on a teacher network, according to some example embodiments. While the various operations in this flowchart are presented and described sequentially, one of ordinary skill will appreciate that some or all of the operations may be executed in a different order, be combined or omitted, or executed in parallel.

Operation 802 is for training, by one or more processors, a teacher model based on teacher speech data. From operation 802, the method flows to operation 804 where the one or more processors initialize a student model with parameters obtained from the trained teacher model.

From operation 804, the method flows to operation 806 for training, by the one or more processors, the student model with adversarial training based on student speech data.

Operation 806 further includes operations 808, 810, and 812. At operation 808, a teacher-student loss, that measures a divergence of outputs between the teacher model and the student model, is minimized. Further, operation 810 is for minimizing a classifier condition loss with respect to parameters of the condition classifier, the classifier condition loss measuring errors caused by acoustic condition classification. Operation 812 is for maximizing the classifier condition loss with respect to parameters of a feature extractor.

The different cost factors may be weighted by coefficients, such as hyperparameter $\lambda$ for the maximization of the classifier condition loss described in equation (7), but other coefficients may be utilized for any of the losses to fine tune the min-max objectives.

Further, from operation 806, the method flows to operation 814 where speech is recognized with the trained student model.

In one example, the condition classifier is a neural network for mapping each deep feature to an acoustic condition.

In one example, the divergence is a $K\mathcal{L}$ divergence that measures how an output distribution of the teacher model diverges from an output distribution of the student model.

In one example, the student model further comprises a classifier to classify units of speech, the units of speech being one of a senone, a phoneme, a tri-phone, a syllable, a part of a word, or a word, and a feature extractor for extracting deep features from the student speech data.

In one example, the teacher speech data comprises a plurality of utterances in a teacher domain, where the student speech data comprises the plurality of utterances in a student domain, where training the student model further comprises providing the plurality of utterances from the teacher speech data in parallel to the plurality of utterances in the student speech data.

In one example, the teacher-student loss is calculated by calculating a teacher senone posterior, calculating a student senone posterior for the deep feature, and calculating the teacher-student loss as a difference between the teacher senone posterior and the student senone posterior.

In one example, the condition defines characteristics of a speaker and an environment where speech is captured.

In one example, training the student model with adversarial teacher-student learning causes the student model to recognize senones similarly to how the teacher model recognizes senones in a condition-robust fashion.

In one example, training the student model with adversarial teacher-student learning causes the student model to lack differentiation among different conditions.

In one example, training the student model is performed iteratively by analyzing the teacher speech data and the student speech data.

It is noted that in some experiments, a noisy test set was evaluated and AT/S achieved relative word error rate improvements of 44.60% and 5.38%, respectively, over a baseline (clean source) model and a T/S learning model.

These results should not be interpreted to be exclusive or limiting, but rather illustrative.

Figure 9:
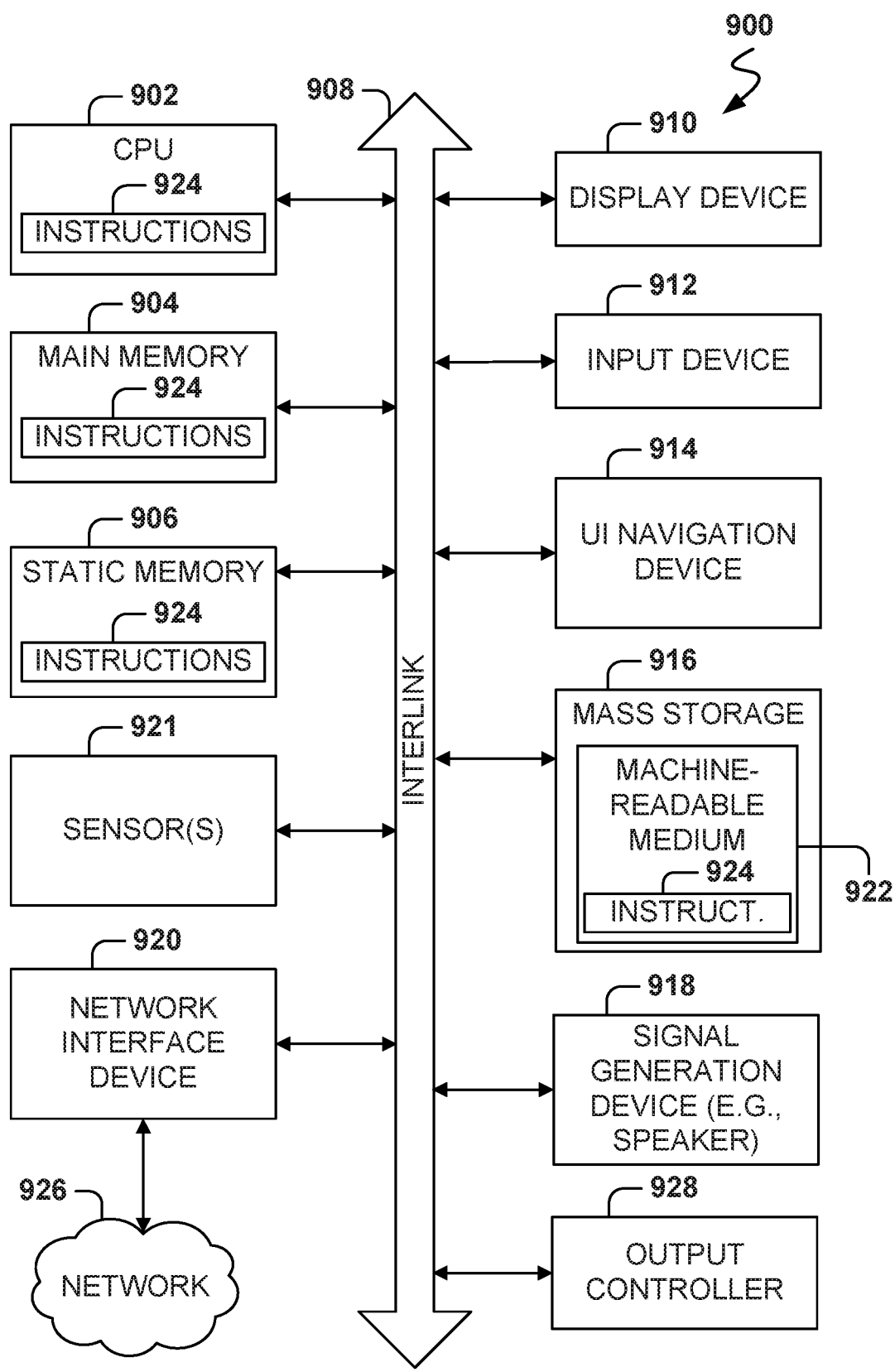
FIG. 9 is a block diagram illustrating an example of a machine upon which one or more example embodiments may be implemented.

FIG. 9 is a block diagram illustrating an example of a machine 900 upon which one or more example embodiments may be implemented. In alternative embodiments, the machine 900 may operate as a standalone device or may be connected (e.g., networked) to other machines. In a networked deployment, the machine 900 may operate in the capacity of a server machine, a client machine, or both in server-client network environments. In an example, the machine 900 may act as a peer machine in peer-to-peer (P2P) (or other distributed) network environment. The machine 900 may be a personal computer (PC), a tablet PC, a set-top box (STB), a laptop, a mobile telephone, a web appliance, a network router, switch or bridge, or any machine capable of executing instructions (sequential or otherwise) that specify actions to be taken by that machine. Further, while only a single machine 900 is illustrated, the term "machine" shall also be taken to include any collection of machines that individually or jointly execute a set (or multiple sets) of instructions to perform any one or more of the methodologies discussed herein, such as cloud computing, software as a service (SaaS), or other computer cluster configurations.

Examples, as described herein, may include, or may operate by, logic or a number of components or mechanisms. Circuitry is a collection of circuits implemented in tangible entities that include hardware (e.g., simple circuits, gates, logic, etc.). Circuitry membership may be flexible over time and underlying hardware variability. Circuitries include members that may, alone or in combination, perform specified operations when operating. In an example, hardware of the circuitry may be immutably designed to carry out a specific operation (e.g., hardwired). In an example, the hardware of the circuitry may include variably connected physical components (e.g., execution units, transistors, simple circuits, etc.) including a computer-readable medium physically modified (e.g., magnetically, electrically, by moveable placement of invariant massed particles, etc.) to encode instructions of the specific operation. In connecting the physical components, the underlying electrical properties of a hardware constituent are changed, for example, from an insulator to a conductor or vice versa. The instructions enable embedded hardware (e.g., the execution units or a loading mechanism) to create members of the circuitry in hardware via the variable connections to carry out portions of the specific operation when in operation. Accordingly, the computer-readable medium is communicatively coupled to the other components of the circuitry when the device is operating. In an example, any of the physical components may be used in more than one member of more than one circuitry. For example, under operation, execution units may be used in a first circuit of a first circuitry at one point in time and reused by a second circuit in the first circuitry, or by a third circuit in a second circuitry, at a different time.

The machine (e.g., computer system) 900 may include a Central Processing Unit (CPU) 902, a main memory 904, and a static memory 906, some or all of which may communicate with each other via an interlink (e.g., bus) 908. The machine 900 may further include a display device 910, one or more input devices 912 (e.g., a keyboard, a microphone, a touchscreen, a game controller, a remote control, a camera, dedicated buttons), and one or more user interface navigation devices 914 (e.g., a mouse, a touchpad, a touchscreen, a joystick, a gaze tracker). In an example, the display device 910, input devices 912, and user interface navigation devices 914 may include a touchscreen display. The machine 900 may additionally include a mass storage device (e.g., drive unit) 916, a signal generation device 918 (e.g., a speaker), a network interface device 920, and one or more sensors 921, such as a Global Positioning System (GPS) sensor, compass, accelerometer, magnetometer, or other sensors. The machine 900 may include an output controller 928, such as a serial (e.g., universal serial bus (USB), parallel, or other wired or wireless (e.g., infrared (IR), near field communication (NFC), etc.) connection to communicate or control one or more peripheral devices (e.g., a printer, a card reader, etc.).

The mass storage device 916 may include a machine-readable medium 922 on which is stored one or more sets of data structures or instructions 924 (e.g., software) embodying or utilized by any one or more of the techniques or functions described herein. The instructions 924 may also reside, completely or at least partially, within the main memory 904, within the static memory 906, or within the CPU 902 during execution thereof by the machine 900. In an example, one or any combination of the CPU 902, the main memory 904, the static memory 906, or the mass storage device 916 may constitute machine-readable media.

While the machine-readable medium 922 is illustrated as a single medium, the term "machine-readable medium" may include a single medium or multiple media (e.g., a centralized or distributed database, and/or associated caches and servers) configured to store the one or more instructions 924. In some example embodiments, the machine-readable medium is a non-transitory machine-readable medium which does not encompass a transitory signal.

The term "machine-readable medium" may include any medium that is capable of storing, encoding, or carrying instructions 924 for execution by the machine 900 and that causes the machine 900 to perform any one or more of the techniques of the present disclosure, or that is capable of storing, encoding or carrying data structures used by or associated with such instructions 924. Non-limiting machine-readable medium examples may include solid-state memories, and optical and magnetic media. Specific examples of machine-readable media may include: non-volatile memory, such as semiconductor memory devices (e.g., Electrically Programmable Read-Only Memory (EPROM), Electrically Erasable Programmable Read-Only Memory (EEPROM)) and flash memory devices; magnetic disks, such as internal hard disks and removable disks; magneto-optical disks; and CD-ROM and DVD-ROM disks.

The instructions 924 may further be transmitted or received over a communications network 926 using a transmission medium via the network interface device 920 utilizing any one of a number of transfer protocols (e.g., frame relay, internet protocol (IP), transmission control protocol (TCP), user datagram protocol (UDP), hypertext transfer protocol (HTTP), etc.). Example communication networks may include a local area network (LAN), a wide area network (WAN), a packet data network (e.g., the Internet), mobile telephone networks (e.g., cellular networks), Plain Old Telephone Service (POTS) networks, wireless data networks (e.g., Institute of Electrical and Electronics Engineers (IEEE) 802.11 family of standards known as Wi-Fi®), IEEE 802.15.4 family of standards, peer-to-peer (P2P) networks, among others. In an example, the network interface device 920 may include one or more physical jacks (e.g., Ethernet, coaxial, or phone jacks) or one or more antennas to connect to the communications network 926. In an example, the network interface device 920 may include a plurality of antennas to wirelessly communicate using at least one of single-input multiple-output (SIMO), multiple-input multiple-output (MIMO), or multiple-input single-output (MISO) techniques. The term "transmission medium" shall be taken to include any intangible medium that is capable of storing, encoding or carrying instructions 924 for execution by the machine 900, and includes digital or analog communications signals or other intangible medium to facilitate communication of such software.

Throughout this specification, plural instances may implement components, operations, or structures described as a single instance. Although individual operations of one or more methods are illustrated and described as separate operations, one or more of the individual operations may be performed concurrently, and nothing requires that the operations be performed in the order illustrated. Structures and functionality presented as separate components in example configurations may be implemented as a combined structure or component. Similarly, structures and functionality presented as a single component may be implemented as separate components. These and other variations, modifications, additions, and improvements fall within the scope of the subject matter herein.

The embodiments illustrated herein are described in sufficient detail to enable those skilled in the art to practice the teachings disclosed. Other embodiments may be used and derived therefrom, such that structural and logical substitutions and changes may be made without departing from the scope of this disclosure. The Detailed Description, therefore, is not to be taken in a limiting sense, and the scope of various embodiments is defined only by the appended claims, along with the full range of equivalents to which such claims are entitled.

As used herein, the term "or" may be construed in either an inclusive or exclusive sense. Moreover, plural instances may be provided for resources, operations, or structures described herein as a single instance. Additionally, boundaries between various resources, operations, modules, engines, and data stores are somewhat arbitrary, and particular operations are illustrated in a context of specific illustrative configurations. Other allocations of functionality are envisioned and may fall within a scope of various embodiments of the present disclosure. In general, structures and functionality presented as separate resources in the example configurations may be implemented as a combined structure or resource. Similarly, structures and functionality presented as a single resource may be implemented as separate resources. These and other variations, modifications, additions, and improvements fall within a scope of embodiments of the present disclosure as represented by the appended claims. The specification and drawings are, accordingly, to be regarded in an illustrative rather than a restrictive sense.

What is claimed is:

1. A method comprising:
    training, by one or more processors, a teacher model based on teacher speech data;
    initializing, by the one or more processors, a student model with parameters obtained from the trained teacher model;
    training, by the one or more processors, the student model with adversarial teacher-student learning based on the teacher speech data and student speech data, training the student model with adversarial teacher-student learning further comprising:
        minimizing a teacher-student loss that measures a divergence of outputs between the teacher model and the student model;
        minimizing a classifier condition loss with respect to parameters of a condition classifier, the classifier condition loss measuring errors caused by acoustic condition classification; and
        maximizing the classifier condition loss with respect to parameters of a feature extractor; and
    recognizing speech with the trained student model.

2. The method as recited in claim 1, wherein the condition classifier is a neural network for mapping each deep feature to an acoustic condition.

3. The method as recited in claim 1, wherein the divergence is a Kullback-Leibler divergence that measures how an output distribution of the teacher model diverges from an output distribution of the student model.

4. The method as recited in claim 1, wherein the student model further comprises:
    a classifier to classify units of speech, the units of speech being one of a senone, a phoneme, a tri-phone, a syllable, a character, a part of a word, or a word; and
    a feature extractor for extracting deep features from the student speech data.

5. The method as recited in claim 1, wherein the teacher speech data comprises a plurality of utterances in a teacher domain, wherein the student speech data comprises the plurality of utterances in a student domain, wherein training the student model further comprises:
    providing the plurality of utterances from the teacher speech data in parallel to the plurality of utterances in the student speech data.

6. The method as recited in claim 1, wherein the teacher-student loss is calculated by:
    calculating a teacher senone posterior;
    calculating a student senone posterior for a deep feature; and
    calculating the teacher-student loss as a difference between the teacher senone posterior and the student senone posterior.

7. The method as recited in claim 1, wherein a condition defines characteristics of a speaker and an environment where speech is captured.

8. The method as recited in claim 1, wherein training the student model with adversarial teacher-student learning causes the student model to recognize senones similarly to how the teacher model recognizes senones in a condition-robust fashion.

9. The method as recited in claim 1, wherein training the student model with adversarial teacher-student learning causes the student model to lack differentiation among different conditions.

10. The method as recited in claim 1, wherein training the student model is performed iteratively by analyzing the teacher speech data and the student speech data.

11. A system comprising:
    a memory comprising instructions; and
    one or more computer processors, wherein the instructions, when executed by the one or more computer processors, cause the one or more computer processors to perform operations comprising:
        training a teacher model based on teacher speech data;
        initializing a student model with parameters obtained from the trained teacher model;
        training the student model with adversarial teacher-student learning based on the teacher speech data and student speech data, training the student model with adversarial teacher-student learning further comprising:

minimizing a teacher-student loss that measures a divergence of outputs between the teacher model and the student model;
minimizing a classifier condition loss with respect to parameters of a condition classifier, the classifier condition loss measuring errors caused by acoustic condition classification; and
maximizing the classifier condition loss with respect to parameters of a feature extractor; and
recognizing speech with the trained student model.

12. The system as recited in claim 11, wherein the condition classifier is a neural network for mapping each deep feature to an acoustic condition.

13. The system as recited in claim 11, wherein the student model further comprises:
a classifier to classify units of speech, the units of speech being one of a senone, a phoneme, a tri-phone, a syllable, a character, a part of a word, or a word; and
a feature extractor for extracting deep features from the student speech data.

14. The system as recited in claim 11, wherein the teacher speech data comprises a plurality of utterances in a teacher domain, wherein the student speech data comprises the plurality of utterances in a student domain, wherein training the student model further comprises:
providing the plurality of utterances from the teacher speech data in parallel to the plurality of utterances in the student speech data.

15. The system as recited in claim 11, wherein training the student model with adversarial teacher-student learning that causes the student model to recognize senones similarly to how the teacher model recognizes senones in a condition-robust fashion, wherein training the student model with adversarial teacher-student learning that cause the student model to lack differentiation among different conditions.

16. A machine-readable storage medium including instructions that, when executed by a machine, cause the machine to perform operations comprising:
training a teacher model based on teacher speech data:
initializing a student model with parameters obtained from the trained teacher model;
training the student model with adversarial teacher-student learning based on the teacher speech data and student speech data, training the student model with adversarial teacher-student learning further comprising:
minimizing a teacher-student loss that measures a divergence of outputs between the teacher model and the student model;
minimizing a classifier condition loss with respect to parameters of a condition classifier, the classifier condition loss measuring errors caused by acoustic condition classification; and
maximizing the classifier condition loss with respect to parameters of a feature extractor; and
recognizing speech with the trained student model.

17. The machine-readable storage medium as recited in claim 16, wherein the condition classifier is a neural network mapping each deep feature to an acoustic condition.

18. The machine-readable storage medium as recited in claim 16, wherein the student model further comprises:
a classifier to classify units of speech, the units of speech being one of a senone, a phoneme, a tri-phone, a syllable, a character, a part of a word, or a word; and
a feature extractor for extracting deep features from the student speech data.

19. The machine-readable storage medium as recited in claim 16, wherein the teacher speech data comprises a plurality of utterances in a teacher domain, wherein the student speech data comprises the plurality of utterances in a student domain, wherein training the student model further comprises:
providing the plurality of utterances from the teacher speech data in parallel to the plurality of utterances in the student speech data.

20. The machine-readable storage medium as recited in claim 16, wherein training the student model with adversarial teacher-student learning causes the student model to recognize senones similarly to how the teacher model recognizes senones in a condition-robust fashion, wherein training the student model with adversarial teacher-student learning cause the student model to lack differentiation among different conditions.

* * * * *